United States Patent [19]

Hölzer

[11] Patent Number: 4,595,206
[45] Date of Patent: Jun. 17, 1986

[54] SEAL WITH INNER AND OUTER SLIDABLY CONTACTING RINGS

[75] Inventor: Helmut Hölzer, Weinheim, Fed. Rep. of Germany

[73] Assignee: Firma Carl Freudenberg, Weinheim, Fed. Rep. of Germany

[21] Appl. No.: 701,788

[22] Filed: Feb. 13, 1985

[30] Foreign Application Priority Data

Mar. 19, 1984 [DE] Fed. Rep. of Germany ....... 3409981

[51] Int. Cl.$^4$ .............................................. F16J 15/34
[52] U.S. Cl. ..................................... 277/25; 277/84; 277/95; 277/134
[58] Field of Search ................... 277/25, 81 R, 82–84, 277/134, 152, 153, 177, 95

[56] References Cited

U.S. PATENT DOCUMENTS

| 2,665,929 | 1/1954 | Sawyer ............................. 277/25 X |
| 3,493,235 | 2/1970 | Pautz et al. ............................. 277/25 |
| 4,348,031 | 9/1982 | Johnston ................................. 277/83 |

FOREIGN PATENT DOCUMENTS

| 893587 | 2/1972 | Canada ................................. 277/134 |
| 127695 | 12/1984 | European Pat. Off. .......... 277/81 R |
| 936483 | 2/1948 | France ................................... 277/25 |
| 300075 | 4/1968 | Sweden ................................. 277/25 |

Primary Examiner—Robert S. Ward
Attorney, Agent, or Firm—Felfe & Lynch

[57] ABSTRACT

A seal for a shaft relatively rotatable in an opening in a structure has concentric inner and outer rings. The outer ring is fixed across the opening and has an inwardly-open groove with axial boundary surfaces which converge toward each other outwardly from the axis of the rings. The inner ring is elastic and has two flanges flanking a midsection which receives the shaft for relative rotation therewith. The flanges slidingly bear elastically on the boundary surfaces to produce the seal. The midsection of the inner ring has a larger outside diameter than the inside diameter of the outer ring to prevent extruding the inner ring from the outer ring under rotation or a pressure differential across the seal.

16 Claims, 4 Drawing Figures

SEAL WITH INNER AND OUTER SLIDABLY CONTACTING RINGS

BACKGROUND OF THE INVENTION

The invention relates to a seal for the clearance between an opening and a shaft passing therethrough.

A known seal has an outer ring made of a rigid material for mounting liquid-tight in an opening in a structure. The inside of the outer ring has an inwardly-open groove having two axial boundary surfaces. An inner ring is made of an elastic material and supported at the groove on a shaft passing through the opening for rotation with the shaft. The inner ring has two, radially outwardly projecting flanges which flank a cylindrical midsection for each flange to be associated with one of the boundary surfaces.

A seal of this type is described in German patent publication No. DOS 26 14 888. It is not intended for continuous operation but merely for a safety measure in a normally-unsealed clearance between the propeller shaft and a bulkhead of a ship. In the rare, for example sinking, cases when it is exposed to water on one side, the water flows into the interior of the seal, between the flanges, and there produces sufficient pressure to force the flange on the low-pressure side sealingly against the boundary surface with which it is associated. The deformation of the flange for sealing is, therefore, a direct function of the pressure differential between the high- and low-pressure sides of the seal. As a result, low or no pressure differential renders the use of such a seal difficult or impossible.

Moreover, the extent of flange deformation necessary to force it sealingly against the boundary surface of the outer ring is dependent on the spacing therebetween. If the spacing is variable or imprecisely set, the seal may respond unreliably. It is, therefore, necessary to set the spacing very precisely and to prevent variation of the spacing during operation from, for example, axial shaft excursions. This gives rise to further difficulties in connection with the practical use of such a seal.

SUMMARY OF THE INVENTION

The invention has as an object improving a seal of the type outlined above in such a way that reliability in continuous operation is obtained regardless of the pressure differential and when, in addition, axial, radial and/or angular displacements of the shaft relative to the opening accommodating it occur continually.

To these and other ends, the invention proposes a seal for a relatively-rotatable structure and shaft having cooperative, concentric inner and outer rings.

The outer ring has an outermost shape for fixed, sealed mounting across an opening in the structure and an axial passage through the ring having a circular cross section for receiving the shaft to be sealed relative to the structure. The axial passage has an inwardly-open, circumferential groove with axial boundary surfaces which converge toward each other outwardly from the axis.

The inner ring is made of an elastically-yielding material. It is spool shaped having a cylindrical midsection flanked by two flanges which extend outward from the axis of the inner ring. An axial passage through the inner ring sealingly receives the shaft for rotation with the shaft relative to the outer ring and structure.

Each of the two, outwardly-projecting flanges of the inner ring bears slidingly on a respective one of the boundary surfaces of the outer ring, elastically prestressed, this being due particularly to elastic deformation of the flanges as the inner ring is inserted into the outer ring. This component of the bearing pressure is constant. However, it is further supplemented by the centrifugal forces generated in the flanges themselves if the inner ring rotates.

The flanges of the inner ring thus are constantly in contact with the boundary surfaces of the outer ring; there is no gap between the two. The seal is, therefore, tight at all times, regardless of whether the shaft is relatively rotating or not.

Although the inner ring is mounted on the shaft sealingly and for rotation therewith, it is slidable on the surface of the sealed shaft to accommodate axial displacement between the shaft and structure in excess of that which can be accommodated by the elasticity of the flanges. For this, too, the outside diameter of the cylindrical midsection of the inner ring is greater than the inside, passage diameter of the outer ring at least on one side of the groove which, in use, will be on the lower-pressure side axially across the seal. The outside diameter of the midsection of the inner ring is, however, advantageously greater than the inside diameter of the outer ring on both sides of the groove. This provides against extruding the inner ring into the clearance between the rings to reduce the likelihood of jamming between the inner and outer rings. Instead, good axial guidance of the inner ring by the outer ring is obtained even when axial displacements occur in operation. Further, no special adjustment of the inner ring is required during installation.

The likelihood of extrusion into the clearance around the outer ring increases with the pressure differential to which the seal is subjected in operation. However, this likelihood can be reduced by increasing the ratio between the outside diameter of the midsection of the inner ring and the inside diameter of the outer ring on the lower-pressure side of the groove. Moreover, axial reinforcing elements made of a solid material may be embedded in the midsection to extend to the immediate vicinity of the edges of the groove or, if desired, slidingly bear on them. Such reinforcing elements may consist of metal pins distributed uniformly around the circumference of the inner ring, for example, or of a tube section which may be vulcanized to the inner ring.

Either or both of the outwardly-convergent boundary surfaces of the groove of the outer ring may be formed by one or more axially-conic surfaces, the latter preferably with successively decreasing conic apex solid angles successively outwardly in the radial direction from the axis. In the later case, a spacing between the boundary surfaces and the associated flange results at the junction between the differently-convergent boundary surfaces which improves the sealing action obtained. Either boundary surface may, however, also be convex or concave, continuously or segmentally, with respect to the axis of the rings.

Under operating conditions, the preferably-liquid medium to be sealed in fills the interior of the seal. It is, however, unable to leave the interior through the rings or in the axial direction of decreasing pressure. A seal is therefore provided.

The seal is effective even when the sealed shaft is temporarily at rest. When it again turns, excellent lubrication of the seal surfaces in dynamic wiping contact with each other is provided from the very start.

This lubrication effect is enhanced with an embodiment in which the boundary surfaces are concave relative to the axis of the rings. In that case, the bearing pressure of each flange on the respectively-associated boundary surface is somewhat reduced in the area of the radially outer circumference of the flange. As a result, liquid from the interior of the seal can better penetrate to the innermore, more-active seal surfaces to lubricate them.

In the embodiment with the concave boundary surfaces, the boundary surfaces make steeper angles with the axis of rotation toward their radially-inner circumferences than toward their outer circumferences with the different inclinations uniformly passing into one another. Seals of this type are particularly well suited for sealing against high pressures when axial, radial and/or angular motion is superimposed on the relative rotary motion of the shaft.

The flange of the inner ring on the side to be away from sealed-in liquid medium may be provided with hydrodynamically-acting return elements for seepage. It is advisable that these be disposed, not on the flange surface which is in sealing contact with the associated boundary surface of the outer ring, but on the outer circumference of the flange. Apart from improving the sealing action, this results in continuous circulation of the liquid in the interior of the seal to help prevent overheating in the area of the dynamic, sealing-contact zone.

The interior of the seal, and especially the space between the two flanges, may be filled with a lubricant in the course of manufacture. A mixture of graphite and polyglycol oil in which the graphite content is about 94% has proved particularly well suited for the purpose. Though of relatively-low viscosity, this mixture has a relatively-high solids content. In addition to good emergency operating properties, it offers good durability.

Any sufficiently-elastic material suitable for such applications may be used to manufacture the inner ring. In addition to rubber, polytetrafluoroethylene (hereinafter PTFE), in particular, is suited for use. In selecting a material, it should be borne in mind that, when sufficient axial displacements of the inner ring on the surface of the sealed shaft occur frequently, there may be sufficient wear in the seal therebetween, ultimately, to result in leaks. For this reason, it is contemplated, in accordance with an advantageous embodiment, to provide a secondary spring element in the space between the flanges which bears elastically on the outer circumference of the midsection of the inner ring. Wear and loss of elasticity of the midsection are thereby automatically compensated. The use of a garter spring, as used to provide bearing pressure for the sealing lip of commonly-employed radial shaft seals, for example, has proved particularly advantageous in this connection.

The elasticity of the inner ring accommodates some relative axial displacement between the structure and shaft and respectively-connected outer and inner rings, but when substantial enough to slide the inner ring back and forth on the shaft, it has proved advantageous for preventing damage to the inner ring to make the radial thickness of the midsection of the inner ring at least 1.5 times as large as the difference in internal, passage diameters in the rings or, in use, the spacing between the outer ring and the sealed shaft at least on one side which, in use, will be the side of the groove at lower-pressure.

The inside, passage diameter of the outer ring should be greater on the other side of the groove which, in use, will be the side of the groove toward the sealed medium. This allows the pressure of the medium inside the groove to aid the sealing hydraulically. Leakage is therefore precluded.

Other advantages of the proposed seal are that it can be manufactured and installed very easily and, hence, at low cost and that its dynamic sealing zones are located within the seal where they are less vulnerable mechanically than in other designs and make it possible for the manufacturer of the seal to obtain optimum results, through special selection and design of the components which are in sliding contact with each other, with respect to both friction and good sealing action.

A few, merely-exemplary, preferred embodiments of the invention are illustrated in the accompanying drawing, in which.

Figure 1:
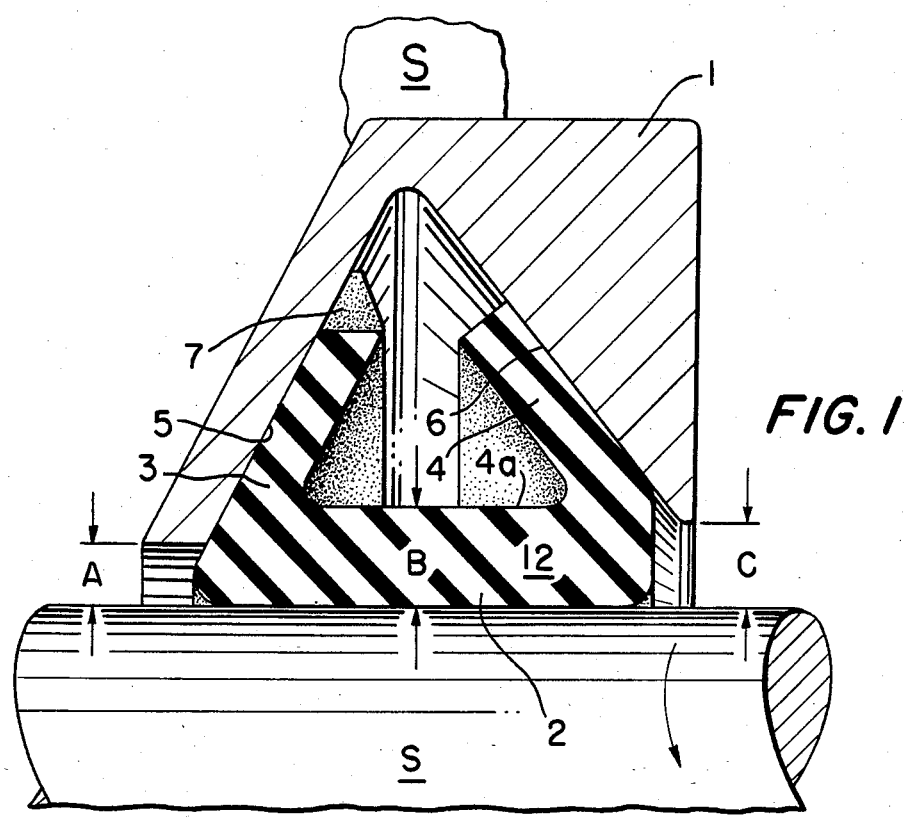
FIG. 1 is half an elevation, partly in section, of a first preferred embodiment.

In all of the preferred embodiments shown in the Figs., an outer ring 1 and an inner ring 2 are sealingly mounted concentrically in an opening in a machine part structure S (shown in FIG. 1 only) and around a shaft s, respectively, for relative rotation therewith, preferably of the shaft relative to the machine part as shown in FIG. 1. Thus, there are no rotational sealing zones between the outer ring and the accommodating machine part or between the inner ring and the surface of the shaft. A liquid-tight rotational seal is therefore obtained from the seal itself.

Also in all of the preferred embodiments shown in the Figs., regardless of the particular design, outwardly-directed flanges 3 and 4 flank a shaft-engaging midsection 4a of the inner ring. The flanges bear at all times, elastically prestressed, on associated, outwardly-convergent boundary surfaces 5 and 6 of the outer ring. This is due, on the one hand, to the particular configuration of the inner ring and to its position relative to the outer ring and, on the other hand, to the elastic properties of the material used to produce the inner ring. As manufactured, for example, the flanges 3 and 4 can extend parallel to each other outwardly in the radial direction, their spacing from each other being such that insertion into the outer ring results in elastic deformation toward each other as a consequence of which they bear elastically on the boundary surfaces of the groove, as desired.

The use of rubber-elastic materials offers a particularly great elasticity potential. However, they have a pronounced tendency to lose elasticity, which is why the use of PTFE is often preferred.

In the embodiment shown in FIG. 1, the inner ring 2 is made of rubber with a Shore A hardness of 76. The outer ring 1 is molded from PTFE. The outer ring has an inwardly-open groove in which the inner ring 2 is set. The groove is axially bounded outwardly by boundary surfaces 5 and 6 which converge on each other. Both boundary surfaces make an angle of 60 degrees with the axis of the rings and shaft rotation to deform the flanges 3 and 4 of the inner ring elastically toward each other from a parallel position before the rings were assembled.

The maximum axial length of the inner ring 2 is smaller than the maximum axial dimensions of the groove of the outer ring. The inner ring therefore is movable in both the axial and the radial direction relative to the outer ring.

The midsection 4a of the inner ring 2 has a radial thickness B which is greater than the adjacent spacings A and C on both sides of the outer ring from the surface of the sealed shaft and the inside surface of the inner ring. Axial displacements of the shaft which exceed the axial play provided for by the rings therefore axially displace the inner ring 2 on the surface of the sealed shaft without this having an appreciable effect on the bearing pressure of the flanges on the associated boundary surfaces of the groove. The relative position of the inner and outer rings therefore requires no particular attention or adjustment even during installation.

The spacing A between the outer ring and the surface of the sealed shaft is on the side of the seal exposed to the atmosphere and is smaller than the corresponding spacing C on the pressure side of the seal. The ring of liquid which revolves in the interior of the seal with the rotation shaft therefore is unable to pass through the clearance of the seal.

The flange 3 of the inner ring 2 disposed on the side of the seal exposed to the atmosphere is provided on its outside with return ribs 7 (only one shown) which are uniformly distributed around its circumference. When the shaft is rotating, these ribs produce a continuous circulation of the liquid in the interior of the seal. This facilitates transmission of heat generated in the dynamic sealing zones between the flanges and boundary surfaces to adjacent machine elements and, hence, its dissipation.

Figure 2:
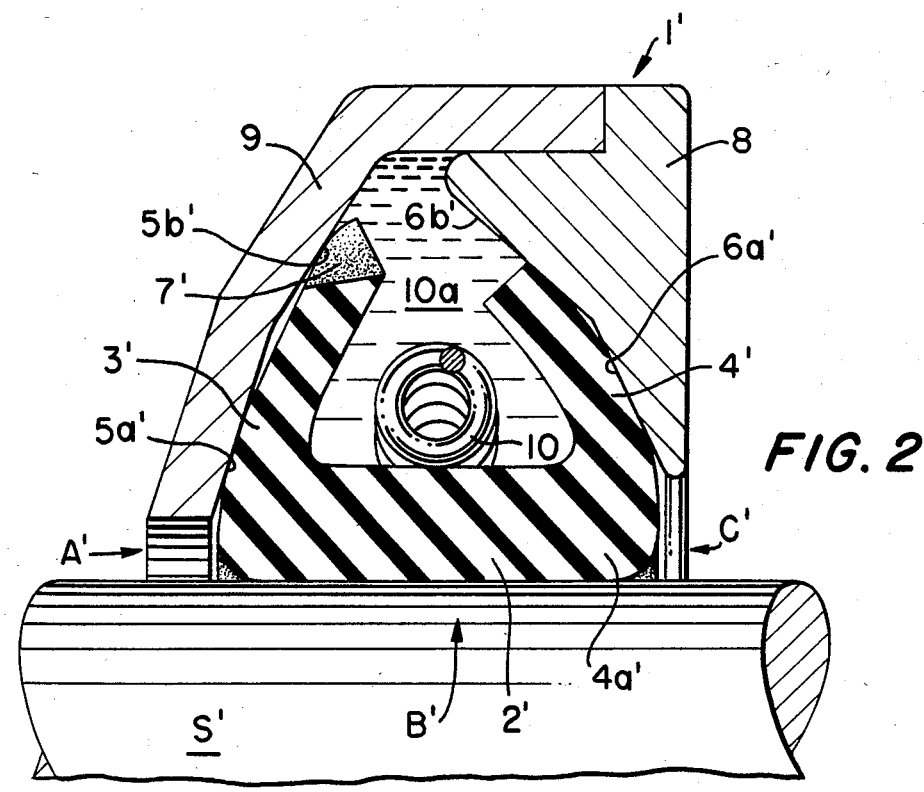
FIG. 2 is half an elevation, partly in section, of a second preferred embodiment.

The seal shown in FIG. 2 generally corresponds to that described in FIG. 1. However, the outer ring 1' is of two-part construction, comprising two partial rings 8 and 9 which are joined in an undetachable and liquid-tight manner. Ring 9 is formed of deep-drawn steel sheet, and ring 8 is formed of a molded plastic.

The facing boundary surfaces 5a', 5b' and 6a', 6b' of the inwardly open groove each comprise two pairs of radially-successive boundary surface sections in mirror-image relationship to each other. They converge toward each other, the outermost pair 5b', 6b' making an angle of 80° to each other and the innermost pair each making an angle of 60° to the axis of rotation.

In this case, too, the inner ring is made of rubber and is manufactured with two parallel flanges 3' and 4'. These are bent toward each other, in the manner shown, after the inner ring has been inserted in the outer ring.

The midsection 4a' of the inner ring 2 is held against the surface of the sealed shaft by a garter spring 10. This improves the static sealing action between the inner ring 2 and the surface of the sealed shaft as is advantageous, especially, when very large axial excursions of the shaft occur frequently.

The remaining hollow space between the inner ring and the outer ring is filled with a lubricant 10a consisting of 93.8% graphite and 6.2% polyglycol oil. The seal thus is extremely smooth-running and has good emergency operating characteristics. It is particularly well suited for sealing a crankshaft.

Figure 3:
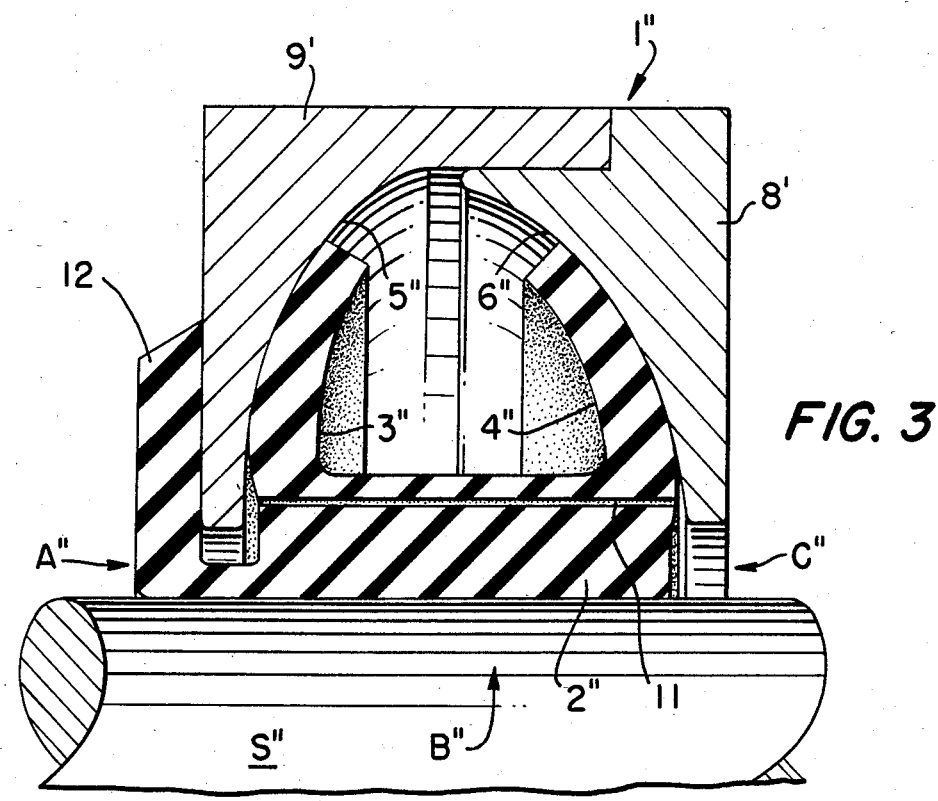
FIG. 3 is half an elevation, partly in section, of a third preferred embodiment.

The embodiment shown in FIG. 3 is also similar, generally, to those of FIGS. 1 and 2. Both parts 8', 9' of the outer ring 1" in this case, however, are made of sintered bronze, and the inner ring is made of PTFE. The seal is, therefore, distinguished by very good heat resistance.

Moreover, the axial boundary surfaces 5", 6" of the inwardly-open groove of the outer ring are concave. The seal is, therefore, able to withstand considerable radial, axial and angular displacements of the sealed shaft even better than the embodiments described above, the service characteristics obtained in this respect being further improved by axial reinforcement of the inner ring 2 with brass rods 11 uniformly distributed around the circumference.

An extension of the inner ring 2" forms a dust lip 12 on the outside of one (left) side of the seal to prevent dust from penetrating into the interior of the seal. This also helps to extend its service life.

Figure 4:
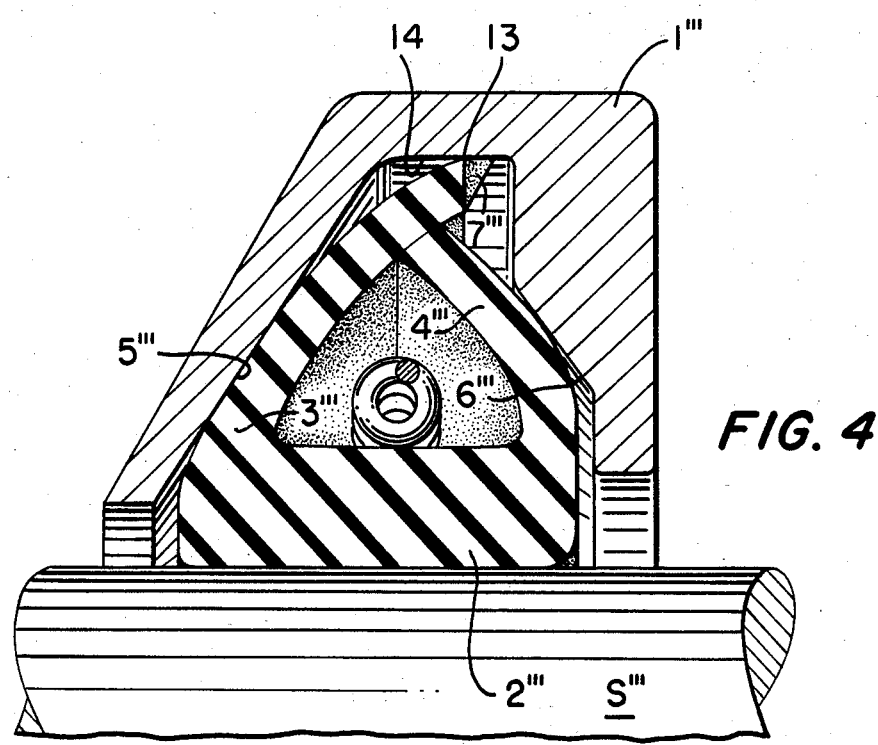
FIG. 4 is half an elevation, partly in section, of a fourth preferred embodiment.

FIG. 4 also relates to an embodiment generally similar to the other Figs., but with the profile of the flange 3''' which, in use, will be remote from the sealed medium outwardly lengthened to an end 13 which touches the outer ring in a cylindrical, base section 14 of the groove therein between the boundary surfaces 5''', 6'''. This provides a further seal.

The boundary surface 6''' on the other side of the outer ring is stepped. This results in radial inward displacement of the boundary surface 6'''. The flange 4''' abutting on the boundary surface 6''' is thus deflected at its circumference sufficiently to bear, elastically prestressed, on the opposite flange 3'''. The latter is thus further forced onto its associated boundary surfaces 5''' and 14 of the outer ring 1 to improve its sealing action. In addition, damping is thus provided when vibrations occur, so that leaks are not likely to develop in this case, either.

It will be understood that the specification and examples are illustrative but not limitative of the present invention and that other embodiments within the spirit and scope of the invention will suggest themselves to those skilled in the art.

What is claimed is:

1. A seal for the clearance between a relatively-rotating shaft and an opening in a structure, comprising:
   an outer ring having an outermost shape for fixed, sealed mounting across the opening in the structure, a circular passage axially therethrough, and an inwardly-open groove circumferentially around the passage and having axial boundary surfaces which converge toward each other outwardly from the axis of the outer ring; and
   a concentric, elastically-yielding inner ring having a cylindrical midsection, an axial passage through the midsection for sealingly receiving the shaft for relative rotation therewith, and two flanges flanking the midsection, extending outwardly from the axis of the inner ring, and elastically bearing, respectively, on one of the boundary surfaces thereby respectively associated with the flanges for sealing, the outside diameter of the midsection being greater than the inside, passage diameter of the outer ring at least on one side of the groove.

2. The seal of claim 1, wherein at least one boundary surface comprises one axially-conic surface.

3. The seal of claim 1, wherein at least one boundary surface comprises at least two, successive axially-conic surfaces.

4. The seal of claim 1, wherein at least one boundary surface is convex with respect to the axis of the outer ring.

5. The seal of claim 1, wherein at least one boundary surface is concave with respect to the axis of the outer ring.

6. The seal of claim 1, and further comprising means on one of the flanges for hydrodynamically returning a liquid medium to be sealed in with the seal.

7. The seal of claim 6, wherein the means comprise return ribs spaced around the outher circumference of the flange.

8. The seal of claim 1, and further comprising a lubricant in the space between the midsection-flanking flanges of the inner ring.

9. The seal of claim 1, and further comprising means around the midsection of the inner ring for urging it inwardly.

10. The seal of claim 9, wherein the means comprises a garter spring.

11. The seal of claim 1, wherein the radial thickness of the midsection of the inner ring is at least 1.5 times the least difference between the inside, passage diameters of the rings.

12. The seal of claim 1, wherein the inside, passage diameter of the outer ring is different on opposite sides of the groove.

13. The seal of claim 1, wherein one flange has a greater diameter than the other.

14. The seal of claim 1, wherein the outside diameter of the midsection of the inner ring is greater than the inside, passage diameter on both sides of the groove in the outer ring.

15. The seal of claim 1, wherein the flanges engage each other outwardly from the midsection of the inner ring.

16. The seal of claim 15, wherein one flange engages the other for elastically urging the other flange toward a boundary surface of the groove.

* * * * *